No. 642,064. Patented Jan. 30, 1900.
S. V. BAILEY.
TREE PROTECTOR.
(Application filed May 27, 1899.)
(No Model.)
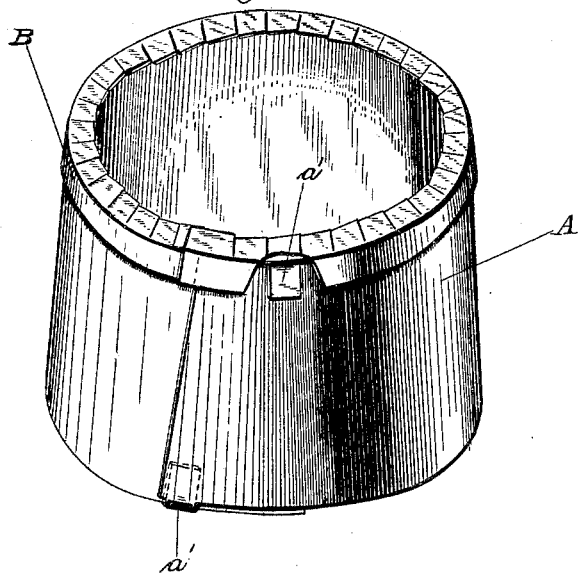
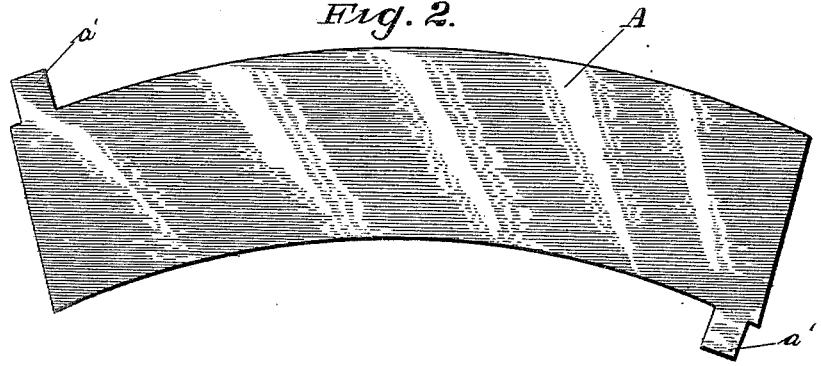
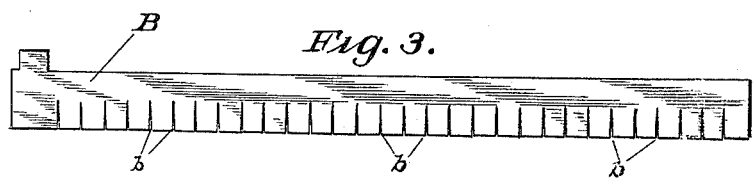
WITNESSES:
F. S. Howell
Edwo. J. Underwood
INVENTOR
Samuel V. Bailey
BY
W. J. Johnston
ATTORNEY

UNITED STATES PATENT OFFICE.

SAMUEL V. BAILEY, OF REISTERSTOWN, MARYLAND.

TREE-PROTECTOR.

SPECIFICATION forming part of Letters Patent No. 642,064, dated January 30, 1900.

Application filed May 27, 1899. Serial No. 718,480. (No model.)

*To all whom it may concern:*

Be it known that I, SAMUEL V. BAILEY, a citizen of the United States, residing at Reisterstown, in the county of Baltimore and State of Maryland, have invented certain new and useful Improvements in Tree-Protectors; and I do hereby declare the following to be a full, clear, and exact description of the invention, such as will enable others skilled in the art to which it appertains to make and use the same.

The invention relates to an improved tree box or protector.

It has for its objects principally to protect or guard the tree against the injurious attacks or ravages of pestiferous or boring insects whose character is well known to those engaged in tree culture; also, to render the tree box or protector self adjusting or accommodating to the growth of the tree; to provide for facility and readiness in putting the tree box or protector in position upon the tree, and to promote simplicity of construction and lessen cost of manufacture, as well as to otherwise improve the tree box or protector.

It consists of a tree box or protector, preferably of imperforate material, shaped or adapted to conform to the contour of the body or trunk of the tree and capable of self adjustment or accommodation to the trunk of the tree, as aforesaid, and also provided with means to readily clasp or connect the meeting or lapping portions thereof together at their top and bottom edges, said tree box or protector adapted to be suitably let into the ground and having applied to its upper end an annular guard or plate, also compassing the tree, all substantially as hereinafter more fully disclosed, and specifically pointed out in the claims.

It will be understood that latitude is allowed herein as to details, as they may be varied at will as circumstances may require without departing from the spirit of the invention.

In the accompanying drawings, illustrating the preferred embodiment of the invention, Figure 1 is a perspective view thereof. Fig. 2 is a view of the blank from which it is principally formed. Fig. 3 is a detached view of the upper annular portion or plate.

In carrying out my invention I construct the tree box or protector of preferably imperforate material or metal, stamping up the blanks therefor or initially producing it as disclosed in Fig. 2, being substantially segmental to cause the same finally to assume the desired form, more or less conical, to approximate and conform substantially to the contour of the body or trunk of the tree it is to compass or surround.

The protector or tree-box A has formed therewith upon its top and bottom edges at diagonally opposite corners clasps or clips $a$ $a'$, the top and bottom clasps being produced upon the opposite lapping portions of said protector, respectively, and adapted to engage and receive said edges, which while serving to hold said lapping portions together permit the same to readily yield automatically to the lateral expansion or growth of the tree, as desired, and thus obviate the manipulation of the tree box or protector by an attendant for that purpose, which is a desideratum in this class of devices.

B is an annular or circular top plate or guard adapted also to encompass the tree and resting upon the top edge of the protector or box A, with its outer edge formed or produced with a pendent circular flange $b$, compassing the closure or tree-box at the upper edge, and its inner or tree-encompassing edge radially slitted, as at $b$, to enable it to readily conform and automatically adjust or accommodate itself to the lateral expansion or growth of the tree, said guard being designed to prevent the borer or insects from passing down inside of said protector or tree-box and reaching in that way the base of the tree.

In placing the tree box or protector in position around or upon the tree a suitable excavation is made in the ground around the tree—say about four inches in depth—and the bottom edge or end of the protector or tree-box set therein. It is then filled around with a suitable composition against the borers or insects passing thereunder and reaching the base of the tree in that way, said composition comprising, it may be, ashes, plaster, and lime or other suitable ingredients for the purpose.

Of course it will be understood that the blank for initially forming or producing the tree box or protector may be struck up in any other suitable shape, it not therefore being essential for that purpose to adopt the aforesaid form of blank or means of constructing the protector.

Having thus fully described the invention, what I claim, and desire to secure by Letters Patent, is—

1. As a new article of manufacture, the tree box or protector, consisting of the body portion having longitudinal lapping edges, and clasps at its bottom and top edges, arranged upon opposite points of said lapping portions or edges, respectively, and the annular or circular top guard resting upon said body portion with its radially-slotted inner edge in contact with the tree and its outer edge having a pendent flange compassing said body portion, at the upper edge, substantially as set forth.

2. The tree box or protector comprising the body portion provided with clasps arranged upon its bottom and top edges, and at diagonally opposite corners thereof, one clasp underlapping or embracing the bottom edge of the opposite portion and the other clasp overlapping the upper edge of the portion opposite, and the top annular plate radially slitted at its inner edge, and having a pendent outer edge portion or flange compassing the upper edge of the said body portion, substantially as set forth.

In testimony whereof I affix my signature in presence of two witnesses.

SAMUEL V. BAILEY.

Witnesses:
DAVID L. SLADE,
H. C. CROSS.